Figure 1:
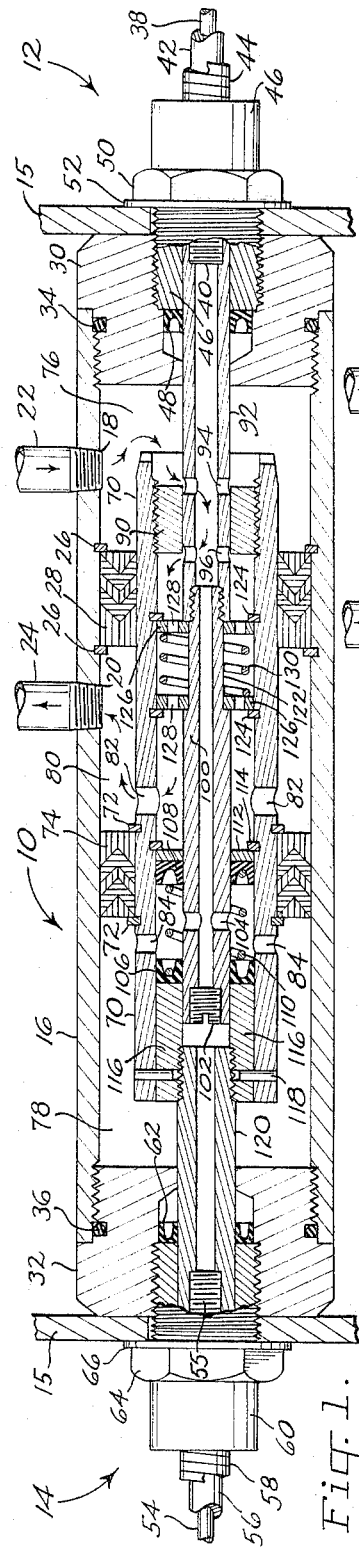

Sept. 27, 1966  J. B. HURLOW  3,274,893
POWER-BOOSTED, PUSH-PULL, CABLE CONTROL APPARATUS
Filed Feb. 24, 1964  2 Sheets-Sheet 1

John B. Hurlow
INVENTOR.

BY Eugene D. Farley
Atty.

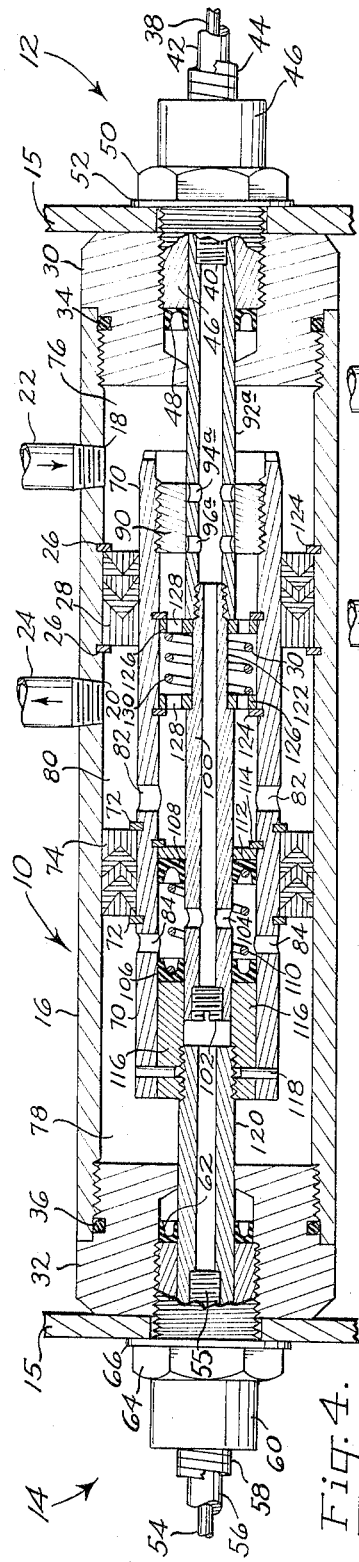
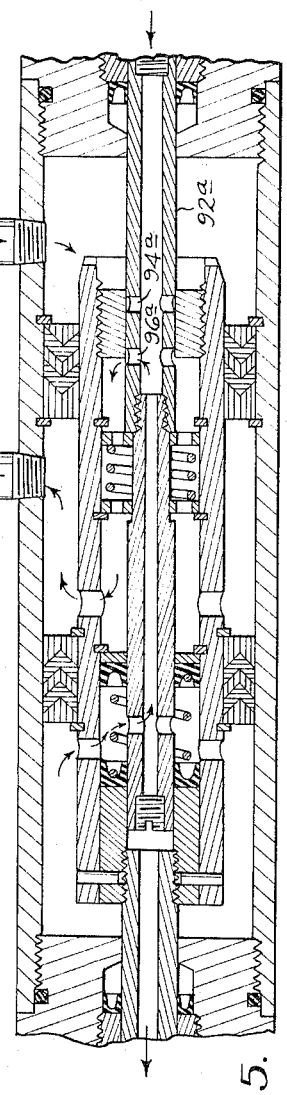
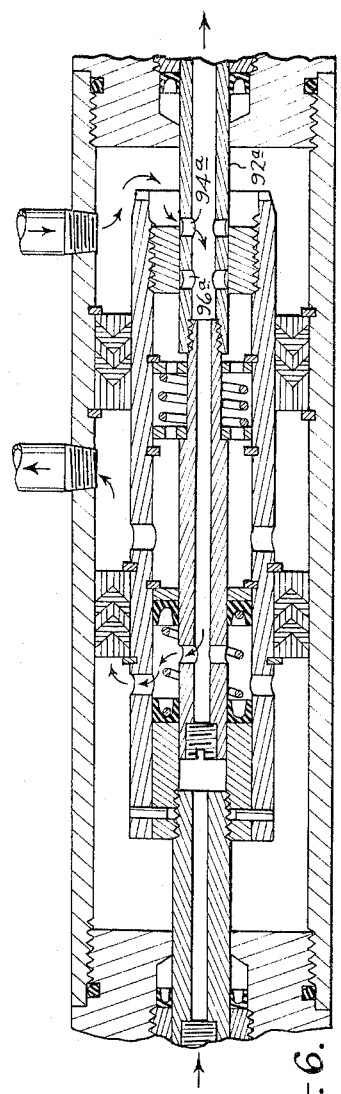

United States Patent Office 3,274,893
Patented Sept. 27, 1966

3,274,893
POWER-BOOSTED, PUSH-PULL, CABLE CONTROL APPARATUS
John B. Hurlow, 2616 Weit Parkway, Tacoma, Wash.
Filed Feb. 24, 1964, Ser. No. 346,623
4 Claims. (Cl. 91—49)

This invention relates to power-boosted, push-pull, cable control apparatus of the class useful in the transmission of control forces between two locations for the operation of heavy duty equipment.

Push-pull cables broadly comprises a smooth, flexible, armored strand, sliding in a flexible conduit. They are widely used in the transmission of control forces around bends and obstructions to inaccessible mechanical elements. In the past their use has been somewhat restricted, however, by reason of their unsuitability to the control of heavy duty equipment.

Accordingly it is the principal object of the present invention to provide a power-boosted, push-pull, flexible cable control wherein the power booster unit is integral with the push-pull cable unit, and which is widely applicable to the control of heavy duty equipment such as lift trucks, cranes, winches, motor truck gear changers and clutches, and marine steering gears.

Other important objects of the invention are the provision of a power boosted, push-pull cable control apparatus having the following features and advantages:

(1) Applicable to uses where continuous operation is required, as in power steering, and equally applicable, with minor structural change, to uses where intermittent operation and the ability to hold a load are required, as in the operation of lift trucks and winches.

(2) Well adapted for use with either hydraulic power or pneumatic power.

(3) Equally applicable (a) from a movable operating station with fixed output, (b) from a fixed operating station with movable output, or (c) with both input and output movable at a fixed intermediate point.

(4) Provided with load feed back, allowing the operator to feed a predetermined percentage of the load for more positive control.

(5) Input station and output load are connected mechanically at all times, making possible manual control of load if booster power fails.

(6) Pressure balanced so that no hydraulic forces are felt at the control station.

(7) The moving element of the booster unit moves inch for inch with the push-pull input cable, thus enabling better control.

The apparatus achieving the foregoing objects and having the enumerated features and advantages broadly comprises in combination with input and output push-pull cables a servo booster cylinder of special design including a piston and relatively movable case, and connecting means for connecting the input and output cables one to the piston and the other to the case.

In particular, in one form of the invention, the sliding member of the input cable is connected to a sliding valve spool which, together with a cooperating valve sleeve, control the motion of the piston. The sliding member of the output cable is connected to the piston.

When the input control is moved a very slight distance, ports in the valve sleeve are uncovered, causing the supply pressure to be applied in a direction to move the piston and reclose the valve ports. The piston thus moves directly with the cable and continues moving only so long as the cable moves. This provides a follow-up action and synchronizes the operation of the input and output cables.

As a further feature, the valve spool is centered by the application of spring means, the resilient pressure of which is determined in part by the load applied to the output cable. The pressure, or load "feel," thus is transmitted back to the operator through the input cable and also assists in obtaining more sensitive control.

Figure 2:
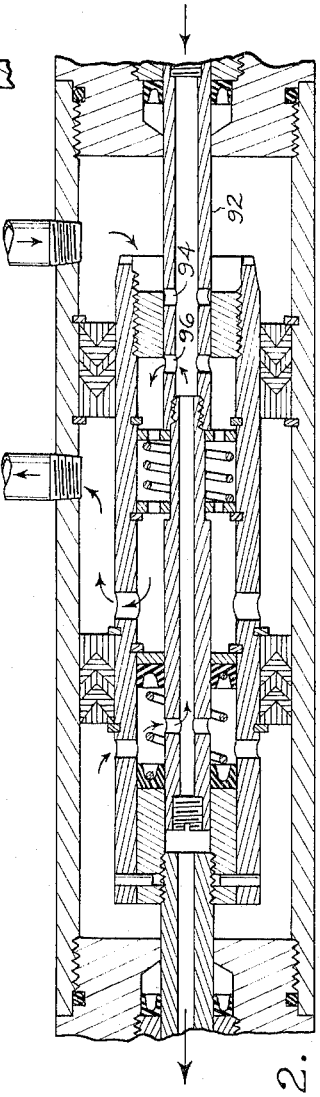
Figure 3:
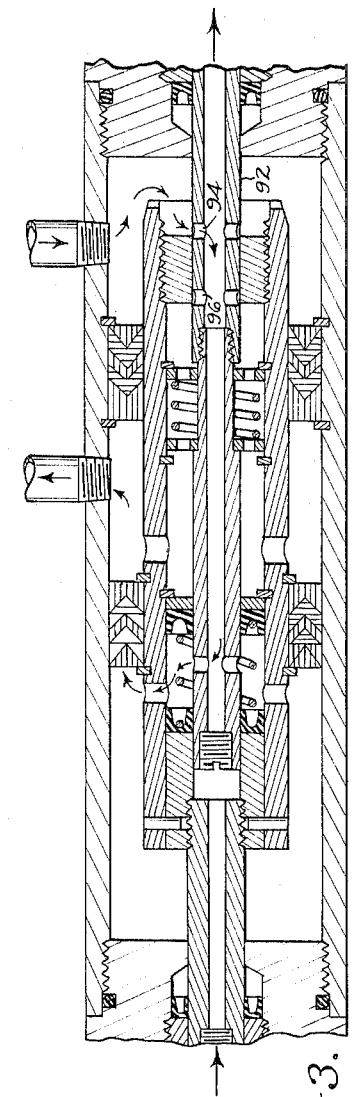

Considering the foregoing in greater detail and with particular reference to the drawings, wherein:

FIGS. 1, 2 and 3 are longitudinal sectional views of the power boosted push-pull cable control apparatus of the present invention in a first, or "open center" embodiment, powered by a continuously circulating fluid flow, the figures illustrating the neutral, forward and reverse positions of the apparatus respectively; and FIGS. 4, 5 and 6 are longitudinal sectional views, similar to FIGS. 1, 2 and 3, but illustrating the "closed center" embodiment of the invention, powered by an intermittently circulating, fluid flow from a constant pressure source, and illustrating respectively the neutral, forward and reverse positions of the apparatus.

As indicated above, the open center apparatus of FIGS. 1, 2 and 3 is applicable in continuous operation, such as occurs during the power steering of heavy vehicles, where the motor fluid is circulating through the apparatus continuously, and where, unless resisted, a force applied either to the output or input cables may be transmitted to the other cable.

The control apparatus of FIGS. 1, 2 and 3 thus includes a servo booster cylinder, indicated generally at 10, connected to input and output flexible cables, indicated generally at 12 and 14. The cylinder may be located at any selected point between the operator, who works the input cable, and the device to be controlled, at the end of the output cable. The cylinder may be mounted on a structural member in any desired manner, as by bolting it to a bracket 15.

The cylinder includes a hollow case 16 of sufficient length and diameter to include the working mechanism. The case is designed to be supplied with fluid under pressure and accordingly is provided with longitudinally spaced inlet and outlet ports, indicated at 18, 20, respectively. Threaded into the ports are inlet and outlet conduits 22, 24 respectively. These communicate with a fluid pressure system which may be either pneumatic or hydraulic. In the former case, conduit 24 may be omitted and port 20 becomes a vent.

On the interior of case 16, between ports 18 and 20, there is provided a pair of radially arranged, longitudinally spaced retaining or snap rings 26, which hold in place a fiber packing ring 28.

The ends of case 16 are internally threaded and mount a pair of end caps 30, 32. These serve the dual functions of sealing off the ends of the case and of mounting the input and output push-pull cables. Sealing rings 34, 36 are provided at the joints between caps 30, 32 and the ends of case 16.

The construction of the flexible push-pull cables mounted in the caps may vary as desired. In the illustrated form of the invention the input cable assembly, indicated generally at 12, comprises an axially movable core strand 38 having on its inner end a threaded plug 40. The core strand moves in a plastic or metal sheath 42, which in turn is reinforced by a helically wound wire cover 44. The core assembly is swaged inside a hollow bolt 46, the threaded end of which passes through bracket 15 and is threaded into cap 30. A U-type seal ring 48 seals the opening of the bore of the bolt. The bolt is held in place by means of jam nut 50 and washer 52, which bear against the outer face surface of bracket 15.

The construction of output push-pull cable 14 may be similar, the longitudinally movable core strand being indicated at 54 and the threaded plug at its inner extremely at 55.

Core strand 54 moves in a sheath 56 wrapped with helical wire 58. This assembly is swaged into hollow bolt 60, threaded into the end of cap 32 and sealed with U ring 62. Jam nut 64 and washer 66 secure the bolt and cable to bracket 15.

Case 16 houses an axially movable, double acting piston 70. This comprises a hollow cylinder of substantial length. Its outer surface is provided with a pair of radially arranged, longitudinally spaced, snap rings 72, which hold in place a fiber piston ring 74. The latter is substantially codimensional with packing ring 28, but located on the opposite side of output port 20.

Rings 28, 74 serve several important functions.

First, they diametrically locate piston 70 in its working position. Second, they serve a sealing function, forming chambers within the booster cylinder. These are: an upstream or forward acting pressure chamber 76, a downstream or reverse acting pressure chamber 78, and an intermediate or venting chamber 80.

Third, piston ring 74 serves to enlarge the effective working diameter of the left hand, or downstream end, of double acting piston 70.

The side wall of piston 70 is provided with two groups of radial ports 82, 84, one group being on each side of piston ring 74.

The upstream end of piston 70 is internally threaded and receives a valve sleeve 90. The latter, in turn, receives in sliding engagement a valve spool formed in two segments.

The upstream valve spool segment 92 comprises a hollow rod, the outer end of which is internally threaded and receives the threaded plug end 40 of the movable strand 38 of input push-pull cable 12, thus connecting the valve spool to that operating member.

Valve spool segment 92 is formed with two groups of radial ports 94, 96, respectively. In the open center arrangement of FIGS. 1, 2 and 3, these groups are longitudinally spaced so that in the normal, rest position of the valve spool, both groups are open for the free flow of fluid.

The inner end of valve spool segment 92 is threaded and connected to a second or downstream valve segment 100. Like segment 92, valve spool segment 100 is hollow, the longitudinal opening therethrough communicating with that through segment 92. Its outer or downstream end is sealed off with a threaded plug 102.

The downstream portion of valve spool segment 100 also is radially drilled to provide ports 104. These open out into a chamber defined by spaced U-type sealing rings 106, 108 maintained in position by coil spring 110.

Sealing ring 108 is backed up by washer 112 which, in turn, is held in place by snap ring 114.

Sealing ring 106 is backed up by a sleeve 116 maintained in position by drive pins 118.

To connect the downstream or output end of piston 70 to output cable 14, the end of sleeve 116 is internally threaded and receives a piston rod 120. The inner end of the piston rod is spaced from the outer end of valve spool segment 100 to allow for longitudinal movement of the latter.

Piston rod 120 has a longitudinal passageway throughout its entire length. The outer end of the passageway is threaded and receives threaded plug 55 connected to moving strand 54 of the output push-pull cable, thereby connecting the piston rod, and the piston, to the device to be controlled.

Since the valve spool moves longitudinally, the space between the outer end of valve spool segment 100 and the inner end of piston rod 120 is variable in extent. Accordingly plug 55 is provided with an opening which communicates with the atmosphere through the bore of piston rod 120. This relieves any pressure that might be built up in the indicated pace and insures proper operation of the valve at all times.

Means are provided for centering the valve spool in a normal rest position in which valve sleeve 90 is centered between ports 94, 96, so that free fluid flow can occur through the latter.

To this end, the inner end of valve spool segment 100 is stepped to provide a section 122 of reduced diameter. The bore of hollow piston 70 is provided with a pair of spaced, central snap rings 124. A pair of spaced, perforated washers 126 with openings 128 are seated against the shoulders provided by the snap rings, the stepped portion of valve spool 100 and the inner end of valve spool segment 92. An interposed coil spring 130 bears against the washers and works to maintain the valve spool in the centered position of FIG. 1.

OPERATION OF THE APPARATUS OF FIGS. 1–3

In the open center embodiment of these figures, the input push-pull cable 12 is connected to the longitudinally slidable valve spool comprised of connected segments 92, 100. The output push-pull cable 14 is connected to piston rod 120. Fitting 22 is connected to a source of pneuematic or hydraulic fluid under pressure. Fitting 24 is vented or in the case of an hydraulic system, connected to the hydraulic reservoir.

In the rest position of FIG. 1 fluid supplied through fitting 22 passes through port 18 into infeed pressure chamber 76. It circulates through port 94 into the hollow interior of valve spool segment 92 through ports 96, 128 and 82 into venting or discharge chamber 80. Thence it exhausts through port 20. Thus the entire system is in dynamic equilibrium, its condition being such that piston 70 may be moved either by the application of load on output push-pull cable 14, or by the application of control force through input push-pull cable 12.

FIG. 2 illustrates the flow when the input push-pull cable 12 has been advanced by the operator. Advancement of the cable advances also valve spool segments 92, 100 substantially closing off ports 94, but leaving open ports 96.

In this position of the valve spool, the pressure fluid entering through port 18 exerts pressure upon the upstream end of piston 70 and the piston moves to the left because the fluid in chamber 78 of the cylinder is free to escape through port 20. In so doing, it passes through ports 84 and 104 into the interior of valve spool segment 100, thence into the interior of valve spool segment 92, out through port 96, ports 128 and ports 82 into vent chamber 80, whence it is free to flow out through outlet port 20.

Piston 70 and the core element of output cable 14 will continue to advance as long as the core element of input cable 12 is advanced. As soon as the advancement of the latter is arrested, continued motion of the piston will open up ports 94, until the equilibrium position of FIG. 1 is assumed. Release of control force on input cable 12 will cause automatic centering of the valve spool to the rest position of FIG. 1, through the action of spring 130.

All during the time the operator advances the input push-pull cable, piston 70 moves inch for inch with it. In addition, the operator is able to gauge the load by the back pressure it exerts, since the differential pressure necessary to operate the load is proportional to the displacement of valve ports 94 and 96 with respect to sleeve 90. Hence at all times a precise degree of control may be achieved.

FIG. 3 illustrates the condition of the apparatus during reversal of the cable control by the operator. Pulling on cable 12 retracts the valve spool comprising segments 92, 100. This in turn substantially closes ports 96 in the valve spool while retaining open ports 94 therein.

Fluid pressure entering chamber 76 from inlet port 18 thus passes through ports 94 and through the hollow communicating stems of valve spool segments 92, 100. It then passes through ports 104 and 84 into reverse pressure chamber 78.

Here it exerts on the reverse face of piston 70 a force opposing that exerted on the front face thereof by fluid entering through input port 18. However, the overall working area of the reverse face of the piston, including the area of piston ring 74, is substantially greater than the area of the front face thereof. Accordingly the piston will move in the reverse direction, i.e. toward the right as viewed in FIG. 3. This is made possible by the free escape of fluid from chamber 80 through output port 20.

Again when the control force on cable 12 is released, spring 130 will return the valve spool to the neutral position of FIG. 1.

THE APPARATUS OF FIGS. 4–6

The "closed center" apparatus of FIGS. 4–6 differs in function from the "open center" apparatus shown in FIGS. 1–3 in that whereas in the latter embodiment there is free circulation of fluid while the control is in neutral position, in the former the flow is blocked in neutral position. The result is to lock the load in whatever position it may be in, a valuable function when the control is applied to lift trucks, winches and like devices.

The apparatus of FIGS. 4–6 may be identical with that of FIGS. 1–3 with the exception that it is provided with a valve spool segment 92a having ports 94a, 96a which are spaced more closely together than are ports 94, 96 of FIGS. 1–3. The same result may be achieved, of course by keeping the spacing of the ports the same and increasing the length of valve sleeve 90.

In either case, in the neutral position of the apparatus the valve sleeve covers over and closes off completely ports 94a, 96a so that there is no flow whatsoever through the system in the equilibrium position of FIG. 4.

However, when the operator advances input cable 12, as shown in FIG. 5, valve stem segment 92a is advanced, opening ports 96a while leaving closed ports 94a. This opens up the system for continued manual advancement of the input cable and valve spool, albeit against the resilience of centering spring 130.

Such motion is possible because the fluid originally locked in chamber 78 passes through ports 84 and 104 into the hollow interior of valve spool segments 92, 100. It then passes out through ports 96a, 128, 82 into chamber 80 whence it exhausts through outlet port 20.

If the operator pulls rather than pushes on control cable 12, the flow illustrated in FIG. 6 occurs.

Pulling on the control cable opens ports 94a, leaving ports 96a closed. Fluid under pressure from chamber 76 accordingly can flow through ports 94a into the hollow interior of communicating valve spool segments 92, 100, out through ports 104, 84 into reverse pressure chamber 78. Here it exerts pressure against the back face of the piston enlarged by piston ring 74. This accordingly drives the piston toward the right, as viewed in FIG. 6, fluid from exhaust chamber 80 escaping through outlet port 20.

In the closed center embodiment, as in the open center embodiment, the piston continues to move as long as controlling force is exerted on the input cable. However, it stops as soon as such force is released.

However, in the closed center form of the apparatus, as soon as the operator discontinues the application of pressure, the system reverts to the rest position of FIG. 4 where it is locked in position. Accordingly the load can not move or be moved until further actuation of the input push-pull cable.

It accordingly will be seen that there is provided an apparatus in which the several objects of this invention are achieved and which is well adapted to meet the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. For use in power-boosted, push-pull cable control apparatus including input and output push-pull cables, a servo booster cylinder comprising
    (a) a hollow case having longitudinally spaced inlet and outlet ports,
    (b) a packing ring mounted inside the case between the ports,
    (c) a hollow piston mounted for axial movement inside the case and packing ring,
    (d) a piston ring on the piston in sliding sealing contact with the inside bore of the case, spaced from the packing ring and at the opposite side of the outlet port,
    (e) ports through the walls of the hollow piston on each side of the piston ring,
    (f) a hollow valve spool mounted for axial movement within the piston,
    (g) spaced inlet ports on one end of the spool adjacent the inlet port through the case,
    (h) valve sleeve means mounted inside the piston in working relation to the inlet ports,
    (i) an outlet port through the spool between the ports on the piston,
    (j) spaced sealing ring means between the piston and spool, one on each side of the outlet port,
    (k) and connecting means for connecting the valve spool to the input push-pull cable and the piston to the output push-pull cable.

2. The apparatus of claim 1 wherein the spaced inlet ports on the end of the spool adjacent the inlet port through the case are normally open in the rest position of the apparatus, permitting free circulation of the fluid through the cylinder.

3. The cylinder of claim 1 wherein the valve sleeve means mounted inside the case normally covers the inlet ports through the end of the spool in the rest position of the cylinder, blocking the circulation of fluid therethrough and locking the piston in place.

4. The cylinder of claim 1 including spring tensioning means interposed between the valve spool and the inside of the hollow piston and acting to oppose the relative movement of the piston and valve spool.

References Cited by the Examiner

UNITED STATES PATENTS

| | | | |
|---|---|---|---|
| 1,923,186 | 8/1933 | Bragg | 91—434 X |
| 2,565,929 | 8/1951 | Onde | 91—384 X |
| 2,909,157 | 10/1959 | Reis | 91—378 X |
| 2,992,633 | 7/1961 | Stiglic | 91—376 X |

FOREIGN PATENTS 773,936    9/1934    France.

MARTIN P. SCHWADRON, *Primary Examiner.*

SAMUEL LEVINE, *Examiner.*

P. T. COBRIN, *Assistant Examiner.*